July 4, 1961  A. W. MUSGRAVE  2,990,619
APPARATUS FOR SOLVING SEISMIC PROBLEMS
Filed June 10, 1957  5 Sheets-Sheet 1

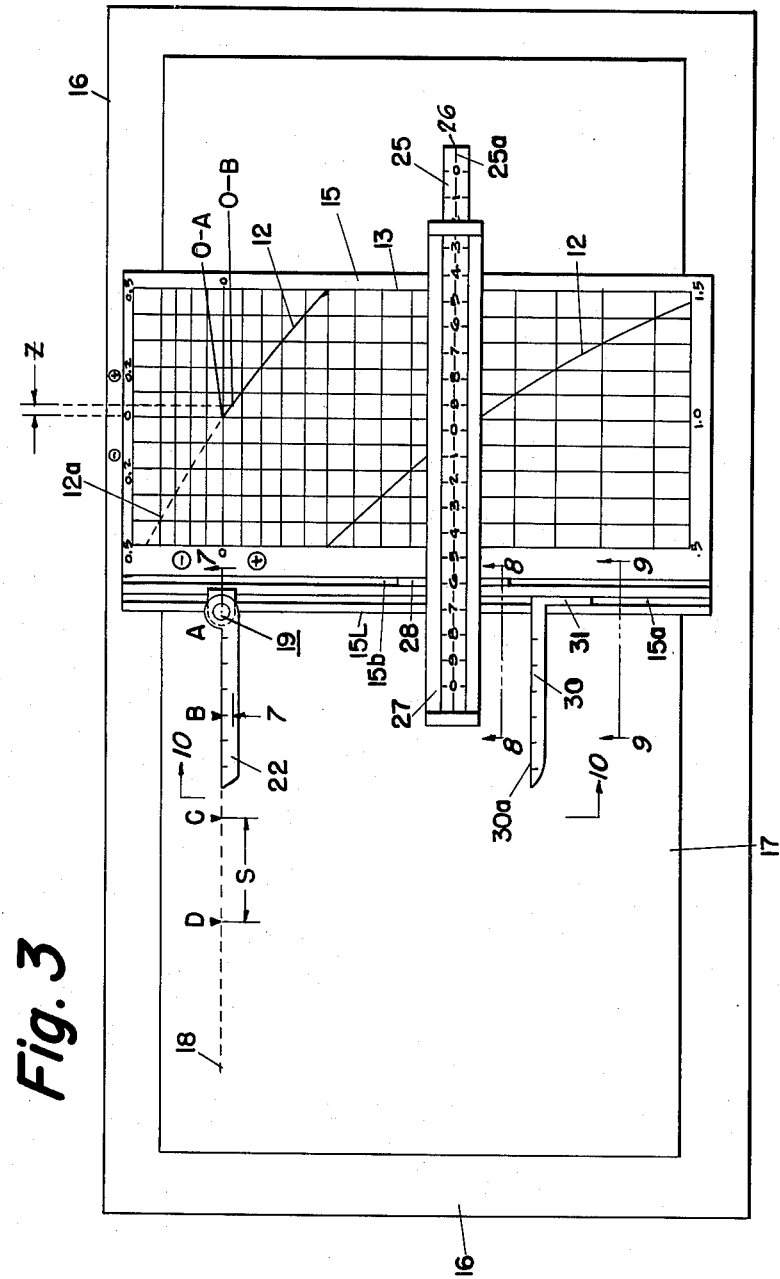

July 4, 1961
A. W. MUSGRAVE
2,990,619
APPARATUS FOR SOLVING SEISMIC PROBLEMS
Filed June 10, 1957
5 Sheets-Sheet 3
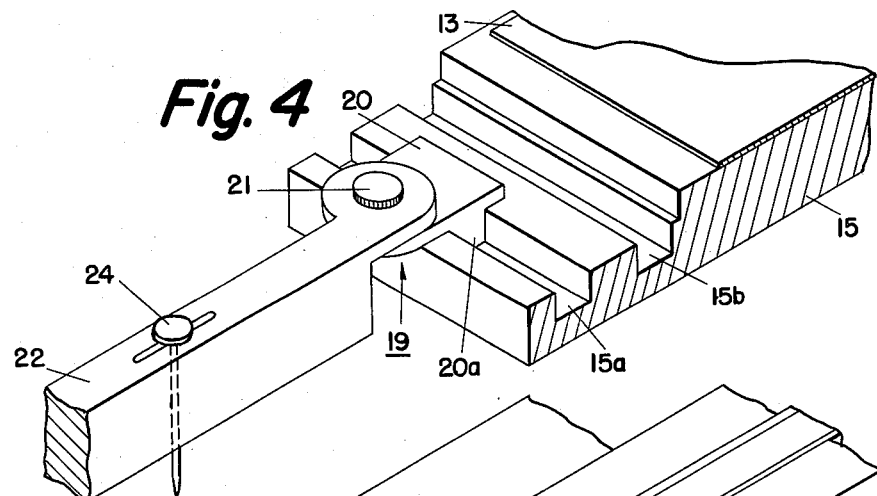
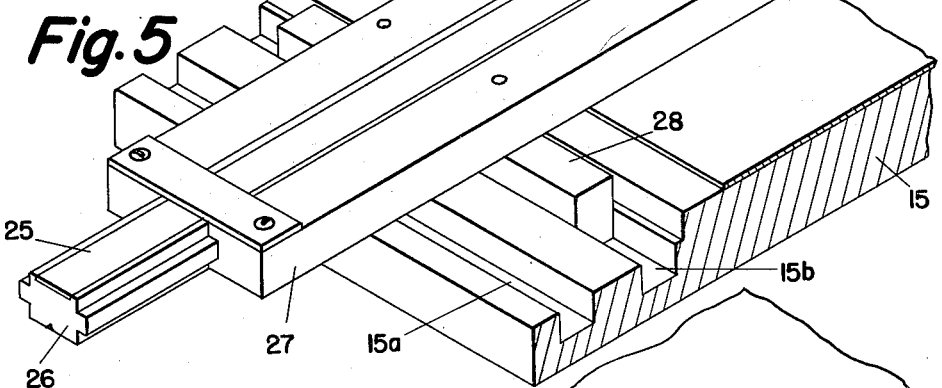
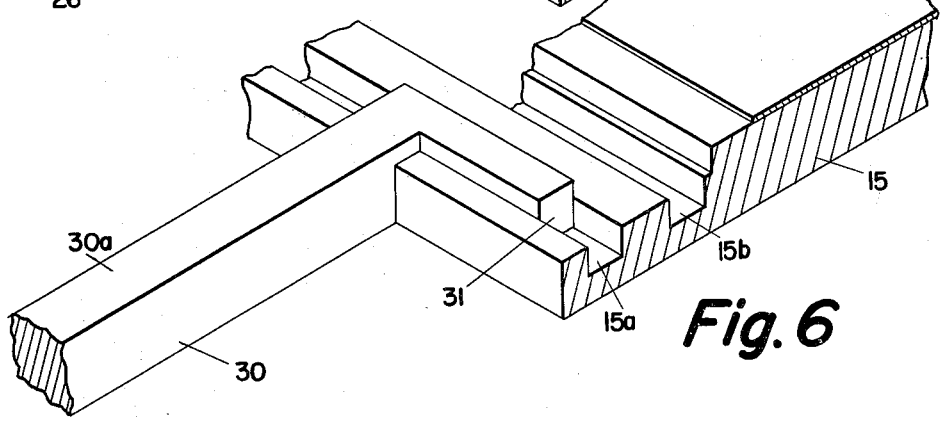

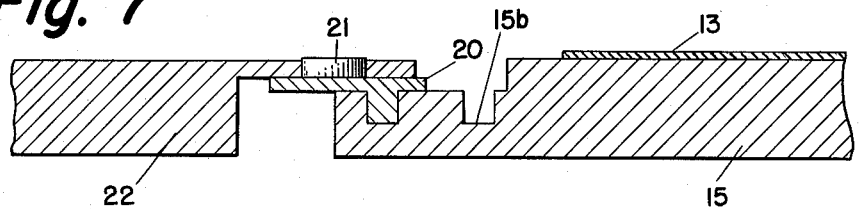
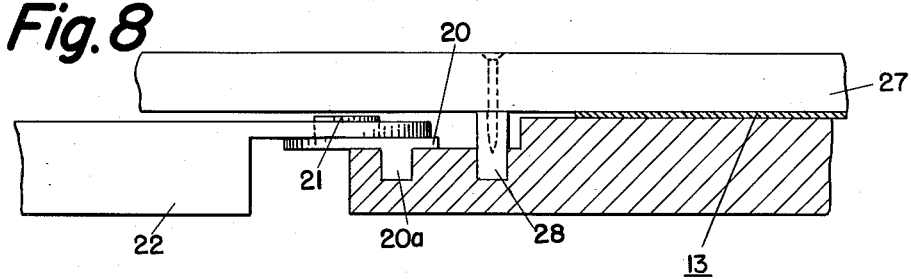
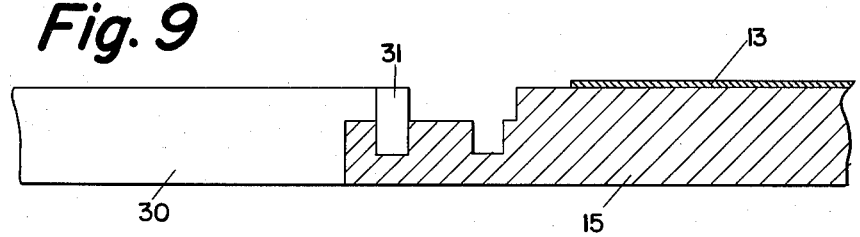
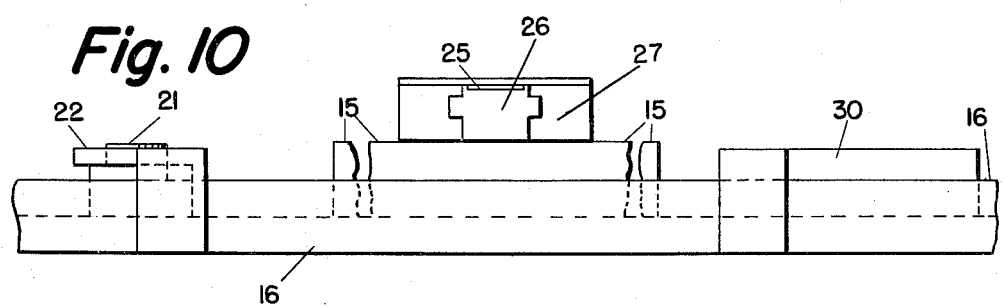

July 4, 1961
A. W. MUSGRAVE
2,990,619
APPARATUS FOR SOLVING SEISMIC PROBLEMS
Filed June 10, 1957
5 Sheets-Sheet 5
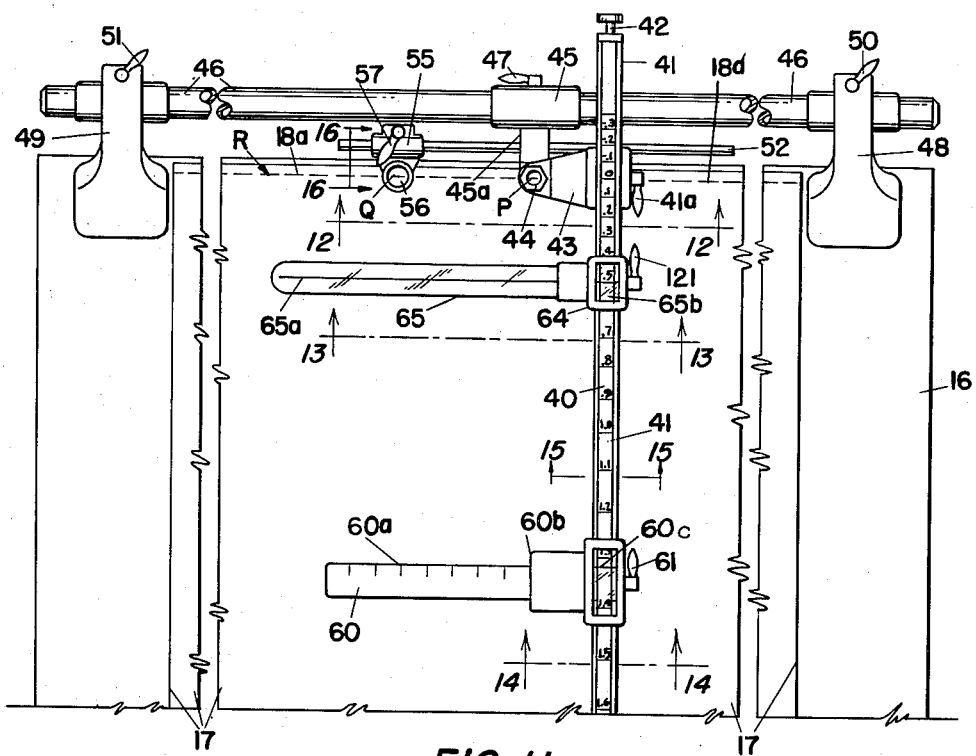
FIG. 11
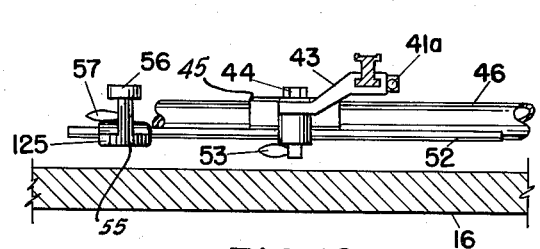
FIG. 12
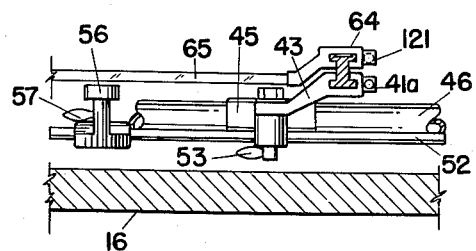
FIG. 13
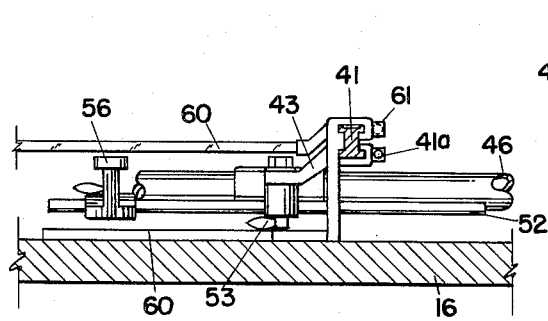
FIG. 14
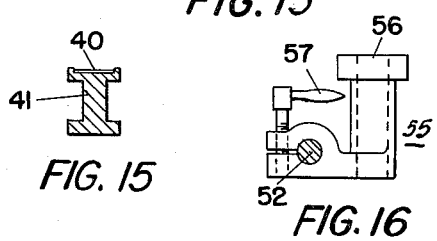
FIG. 15
FIG. 16

United States Patent Office 2,990,619
Patented July 4, 1961

2,990,619
APPARATUS FOR SOLVING SEISMIC PROBLEMS
Albert W. Musgrave, Dallas, Tex., assignor, by mesne assignments, to Socony Mobil Oil Company, Inc., New York, N.Y., a corporation of New York
Filed June 10, 1957, Ser. No. 664,693
11 Claims. (Cl. 33—76)

This invention relates to instruments for contour plotting of subsurface strata such as the depth and dip of reflecting beds, and has for an object the provision of an instrument which takes into account lateral changes in velocity in avoidance of over-migration or offset of dips.

As well understood by those skilled in the art, seismograms are made by recording the time between the generation of seismic waves as by detonation of a small charge of dynamite and the arrival of that energy at geophones, devices responsive to the seismic waves. In general, a plurality of geophones are spaced one from the other along a line of the seismic survey. Time is generally measured with resolution to $\frac{1}{1000}$ of a second. The time required for the energy to return to the receivers from a shot point may be as great as several seconds. The seismic or acoustic energy at the shot point travels in all directions as more or less spherical waves. The spherically shaped surface or wavefront changes in a manner dependent upon the nature of the strata being penetrated. For some purposes, it is convenient and adequately accurate to assume that the velocity with which the wavefront travels increases as a function of depth. If an imaginary line be drawn that is perpendicular to all wavefronts it crosses, that line is representative of a raypath. The term raypath is utilized in explaining the travel of seismic energy since that energy is reflected or refracted in much the same manner as light rays. As the downwardly moving energy arrives at a seismic discontinuity which in general corresponds with a lithologic and formation interface, a part of the energy is reflected and a part continues downwardly though somewhat refracted throughout the region of the discontinuity or reflecting interface.

If it could be assumed that all raypaths are straight lines, the desired calculations would be greatly simplified. Such an assumption would mean that the velocity from a shot point to an interface is constant, or in the alternative, that all interfaces are perpendicular to a given raypath. The foregoing assumptions are not valid because the subsurface formations, and in particular the reflecting interfaces, are not necessarily parallel to a selected datum plane nor perpendicular to a given raypath. Where there is a tilting of the strata after deposition and lithofication and in cases where there has been a folding after lithofication, the assumption that isovelocity planes are parallel to the datum plane may no longer be valid. Accordingly, if depth and dip plotters, such as shown in McGuckin Patent No. 2,535,220 be utilized, there will not be taken into account lateral changes in velocity. Unless such changes are taken into account in contour plotting, errors will arise. The dip may be too high, the offset upon migration too great, and the depth too shallow.

In contrast with such a contour plotter where there is implicitly assumed the existence of a horizontal datum and horizontal isovelocity planes, or planes parallel to a given datum plane, the present invention provides an instrument in which there is taken into account lateral change of velocity and particularly where the isovelocity planes are all parallel and follow lithic boundaries.

In carrying out the present invention in one form thereof, a time-depth curve for one point in the area under survey is utilized in conjunction with the seismic data taken over the remaining portion of the area under survey in order to correct for the lateral change in velocity. More particularly, the data taken at all shot points remote from the one at which the time-depth curve was made is moved relative to that curve in order that the subsequent data follow the structural attitude of the beds. Under these conditions the seismic raypaths will be straight lines and the instrument forming a part of this invention will plot depth, dip and offset in the absence of errors due to lateral change of velocity. In addition, where the isovelocity surfaces are not parallel but of a kind which may increase in dip with depth, the present instrument will provide a nearer approximation for the location of depth, dip and offset than has heretofore been possible with plotting instruments and particularly when the assumption is made that the isovelocity planes follow a selected interface. In this manner there will be minimized overmigration of the dips, i.e., the location on a chart of an assumed reflection point which, with reference to a vertical raypath, is beyond the position where the reflection actually takes place.

Further in accordance with the present invention, there is provided a supporting means for a time-depth scale. This is disposed over a chart on which depth and dip are to be plotted. The chart has thereon a line representing the trace of a selected datum plane and on which the shot points are marked with a spacing dependent upon the distance scale utilized for the time-depth scale. A scribing bar is fixed in a position on the time-depth scale at a point corresponding with the reflection time for a first shot point. A correcting bar is then located on the time-depth scale at a point spaced from the scribing bar equal to the reflection time at a second of the shot points. Both bars extend in directions normal to the time-depth scale and from one shot point toward the second of the shot points. The time-depth scale is pivoted for rotation about an axis coincident with the first shot point and with a zero point on said time-depth scale.

When a line on the correcting bar coinciding with its setting on the time-depth scale extends through the location of the second shot point, the scribing surface will be positioned at the proper depth and at the proper inclination for drawing on the chart the segment of subsurface strata represented by the reflection times at the two shot points. It will have a length corresponding with the spacing between the two shot points.

The foregoing procedure is repeated for all selected reflections noted on the seismogram taken at the two shot points. The instrument is then located for pivotal movement relative to the second of said shot points with the zero of said time-depth scale adjusted relative to the pivotal point by an amount equal to the average difference between reflection times at the first and second shot points. The above procedure is then repeated with respect to reflections from the second and a third shot point but with all manipulations relative to the adjusted zero on said time-depth scale.

For further objects and advantages of the invention, reference is to be made to the following detailed description of two different embodiments of the invention taken in conjunction with the accompanying drawings, in which:

FIG. 3 is a plan view of a preferred embodiment of the invention;

FIGS. 4–6 are isometric views of fractional parts of the instrument of FIG. 3;

FIGS. 7–9 are fractional sectional views taken respectively along lines 7—7, 8—8 and 9—9 of FIG. 3;

FIG. 10 is a side view of a part of the instrument as viewed between lines 10—10 of FIG. 3;

FIG. 11 is a plan view of another preferred form of the invention;

FIGS. 12-14 are sectional views respectively taken along the lines 12—12, 13—13 and 14—14 of FIG. 11;

FIG. 15 is a sectional view of carrier 41 taken on the line 15—15 of FIG. 11; and FIG. 16 is a sectional view taken on the line 16—16 of FIG. 11.

Figure 1:
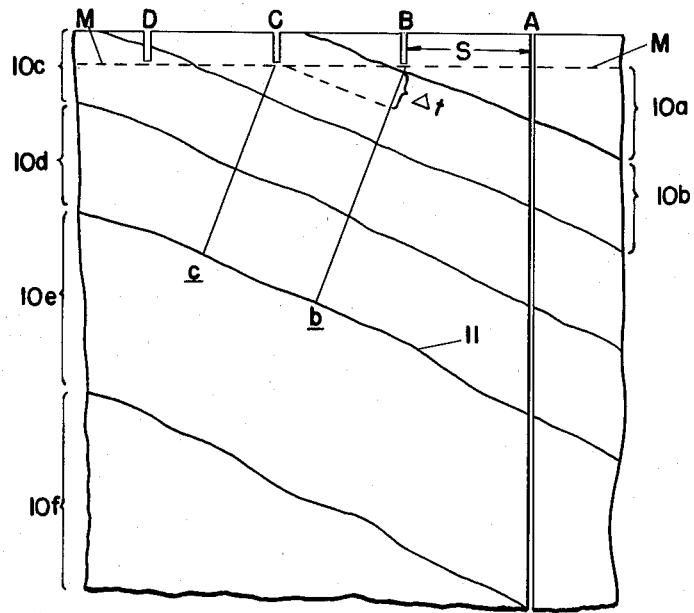
FIG. 1 is a cross-section of earth strata to be referred to in explaining the present invention.

Referring to FIG. 1, there have been identified, on a section 10 of the earth, shot points A—D. These overlie a section in which there is tilting of strata 10a—10f. The boundary lines may be taken as representative of isovelocity lines which are in general parallel to each other, it being remembered that in general the velocity of the seismic energy within the earth increases with increasing depth. To produce seismic energy, a small charge of dynamite is detonated in a selected one of the boreholes A—D. The holes or bores A—D are relatively shallow, and in general penetrate somewhat below the weathered surface layer. Thus, a datum plane whose elevation is shown by the broken line M—M is taken as a reference. Thus, if it be assumed that there is a burst of seismic energy at shot point B, the direct raypath Bb will be normal to the inclined interfaces. A similar raypath from shotpoint C will be Cc, each raypath originating at the datum line. The length of the line Cc represents a fixed distance and so does the line Bb but the latter line is the longer of the two. In terms of travel time of seismic energy, the travel time from shot point B at the datum plane to the interface at b will be materially greater than the travel time from the datum plane at C to the point c on the selected interface. The difference in such travel times is represented by the time interval $\Delta t$, FIG. 1.

It is the purpose of the present invention to utilize the travel times at B and C in order that the depth and dip of the interface between c and b may be located with considerable accuracy. This objective is accomplished by utilizing known techniques at borehole A which penetrates through the strata being investigated to obtain a time-depth curve. Such a curve may be obtained by a velocity log of borehole A, by a reflection-velocity survey, or by seismic uphole surveys in borehole A. Such a time-depth curve 12 has been illustrated in FIG. 2 with time plotted as abscissae. While the time scale has been shown with equal increments of time, the depth scale, the ordinates, has been shown with markings representative of each increment of depth corresponding to an increment of time. Since the curve 12 is concave downwardly, the depth markings in terms of the equal spacing of the time markings increases with increasing time.

As will be later explained, one form of the present invention makes use of the concept of negative time. Thus, in FIG. 2 it will be noted that the curve 12 has been extrapolated as indicated by the broken line at 12a to the left of the origin and that corresponding markings of negative depth appear above the origin of curve 12. The origin of the curve at time 0 and at 0 depth is the location of the datum plane which has heretofore been mentioned, and is understood in the art to be a plane in respect to which all seismic data is corrected. As will hereinafter be shown, there is a correcting adjustment, a relative movement as between the datum plane and the time-depth chart or scale, at each new shot point in order to fit the time-depth curve to the strata lying beneath each shot point.

In the embodiments of the invention as shown in FIGS. 3–10, a supporting means for the time-depth scale in the form of the curve 12 is shown as a flat plate or board 15. While the curve 12 could be plotted directly on the surface of board 15, it will in general be preferred to plot the curve 12 on cross-section paper, such as paper 13, FIG. 7, and attach the same to the board by any suitable means, such as by cement or adhesive tape.

Supporting means 15 for the time-depth scale overlies a table or drafting board 16 on which there is suitably secured a chart 17 arranged to receive a plot of the depth and dip of the discontinuities or interfaces of the area under investigation. Along the upper edge of the chart 17, there is drawn a line 18 representative of the trace of the datum plane selected for the area under investigation. On the datum line 18, there are established locations for the shot points A—D, which for the purpose of the present description, are assumed to be of uniform separation with the distances S representative of spacings between shot points A—D on a scale corresponding with that utilized for depth or for the ordinates of the curve 12.

The supporting means 15 has associated with it a pivotal means 19 establishing an axis of rotation which extends through the location of a shot point, i.e., the shot point A of FIG. 3. The pivotal mounting means 19, FIG. 4, is shown as including a supporting member 20 having a projection 20a extending downwardly into a groove 15a of the supporting means 15. The member 20 has upstanding therefrom a cylindrical supporting pin or tube which is encircled by a hub formed at the end of an arm 22. It is to be noted the axis of rotation coincides with the left-hand edge of the supporting plate or board 15.

It is to be further noted that the upper portion of the arm 22 is so dimensioned that the upper surface of that arm lies in a plane which when extended to the right intersects the axis of rotation. The support 15 can slide upwardly or downwardly relative to arm 22, once arm 22 has been positioned with pivotal means 19 centered directly over the shot point A. This will establish the axis of rotation of support 15 relative to the shot point A. The cylindrical member 21 may be a tube or a transparent member. Such being the case, the positioning can be done by looking through the opening of the tube or through such member for the alignment with the shot point A.

Upon orientation of the arm 22 and the supporting board 15 in the foregoing manner, the arm 22 is secured in fixed position on the board or chart carrier 16 by any suitable means, for example as by push pins, one of which, the pin 24, is shown in a slot in the arm 22 in FIG. 4. As described in connection with a later embodiment, the arm 22 may likewise be clamped to the board by conventional means.

With the arm 22 secured to the plotting board or chart carrier 16, the supporting means 15 and time-depth curve 12 are moved relative to pivot means 19 so that an extension of line O—O passes through the center of pivot means 19. If desired, clamping means may be provided for supporting means 15 to prevent a shift in the position of the time scale relative to pivot means 19 during the subsequent operations. Such a clamping means has not been shown since generally it is not necessary to the operation of the instrument.

With the instrument set up as above described and as shown in FIG. 3, it is now ready to be used in determination of the depth and dip of strata giving rise to reflections which are present on a first seismogram "A" secured at shot point A and on a second seismogram "B" secured at shot point B. The seismograms are not illustrated in the drawings. These reflections are identified in the usual manner and the travel time for each reflection is determined. It is assumed for the purpose of the present description that one geophone spread will be located at shot point A and another at shot point B as the survey progresses along a traverse across an area being explored. The mean or average travel time for a given reflection on each record will then be employed for plotting depth, dip and offset of the segments of the reflecting horizons along which reflection took place.

While data read directly from seismograms "A" and "B" will be employed in plotting operations, typical data, representative of three reflections has been tabulated in the following table to assist in the following further description.

TABLE I

One-way travel time to a reflecting interface

|  | SEISMOGRAM "A" | SEISMOGRAM "B" |
| --- | --- | --- |
| First Reflection | 0.468 second | 0.437 second |
| Second Reflection | 0.698 second | 0.667 second |
| Third Reflection | 0.831 second | 0.800 second |

The travel time to the first reflection at shot point A and as determined from seismogram "A" is 0.468 second. This time is then noted on a time scale 25 carried by a slide 26 mounted, FIG. 5, in a slide carrier 27 which has a depending slidable support 28 disposed within a groove 15b of the supporting board 15. Thus, the slide carrier 27, extending horizontally across the time scale 12, as viewed in FIG. 3, may be moved vertically relative to support 15. It is moved upwardly until the horizontal center line 25a of the scale 25 passes through the axis of pivotal means 19. It also coincides with the line O—O of the time-depth scale. The slide 26 is then moved to the left until the reflection time 0.468, as read on scale 25, coincides with the O—A point on the time scale. The slide carrier or carriage 27 is then moved along the groove 15b until the center line 25a of the time scale 25 intersects the curve 12 at a zero (0) point on time scale 25.

Figure 2:
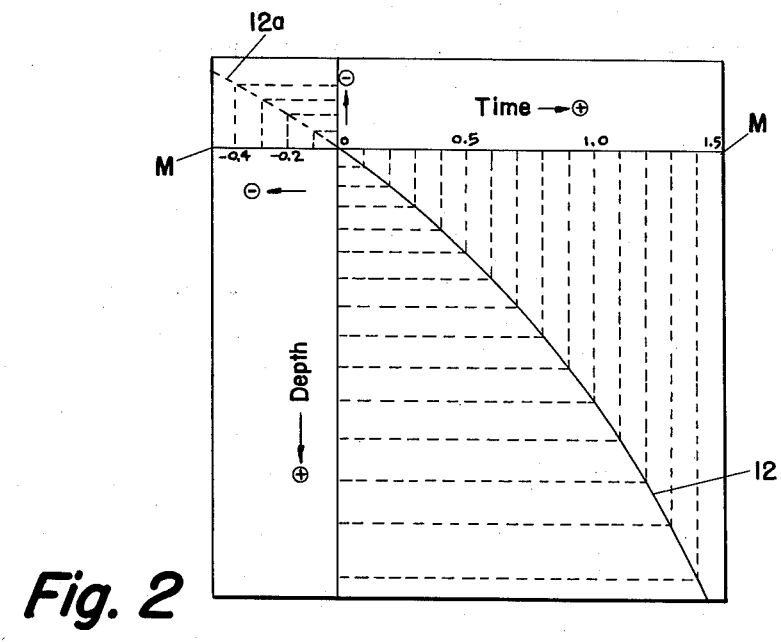
FIG. 2 is a graph typical of those to be prepared in accordance with the present invention.

It may here be observed that the time-depth scale or or curve 12 of FIG. 2 has been "folded" so that the left-hand half of curve 12, FIG. 2, forms the upper portion of the time-depth scale while the lower section of curve 12, FIG. 3, forms the lower portion of the time-depth scale corresponding to the right-hand half of the curve of FIG. 2. It may be noted that the time scale for curve 12 has a width corresponding with one second. Thus, for seismograms several seconds long, there may be a folding of the time-depth scale with the number of folds corresponding with the number of seconds containing reflections to be plotted. While other scales may be selected, a width corresponding with a second has been found convenient in practical application of the invention and permits use of a suport 15 of suitable proportions.

It may be further noted that the time scale 25 on the slide 26 is twice as long as the width in time of each section of curve 12 and that the markings on the scale 25 are of ascending order from right to left. This selection of numbering on the scale 25 is for the purpose of making that scale compatible with the plot of the time-depth curve 12 and is useful in the present invention as will now be explained. Location on the scale 25 of the time 0.468 coincident with the point O—A establishes a distance to the right of the point O—A to the zero (0) on scale 25 equal to 0.468. Thus, when the carrier 27 is moved downwardly until the 0 on scale 25 intersects curve 12, there will be established on that curve a depth corresponding with the travel time of 0.468.

The vertical depth as thus established is now used to position a scribing bar 30 having a scribing edge or surface 30a and having graduations thereon corresponding with the scale used for the separation distance between points A and B. The scribing bar 30 also has at right angles thereto, FIG. 6, a depending slide 31 nesting and slidably supporting the scribing bar 30 in the groove 15a of the supporting board 15. The scribing bar 30 is moved upwardly and beneath the carriage 27 until the scribing edge or surface 30a is in alignment with the center line 25a of the scale 25 in its new position described above.

The slide carrier 27 is now moved upwardly until the time of 0.437 on scale 25 falls on the curve 12. The time 0.437 corresponds with the average travel time for the first reflection as recorded on seismogram B.

It will now be apparent that the new position of the horizontal center line 25a of scale 25 will be representative of the difference between the times 0.468 and 0.437 (plus 0.031), but the difference in the positioning of the scale 25 is with reference to the first depth-position of scale 25 corresponding with the reflection time of 0.468 and the new depth-position there established from the adjacent depth-position and not from the O—A point on curve 12. Thus, the difference in times in determination of the position of the scale 25 is established in respect to the depth scale, the ordinates, and not by differences along the abscissae and corresponding with the time scale. The foregoing is an important concept in the present invention since it is of assistance in taking into account lateral changes in velocity of the formations and prevents over-migration of dips and error in the depths at which they are located.

The establishment of the depth, dip and offset of a formation for the first reflection is now completed by rotating the time scale and its supporting board 15 about its pivotal axis 19 until the center line 25a of scale 25 coincides with the location of the shot point B. Thus, it will be seen that the slide 26 and the scale 25 with its center line 25a are also utilized as a correcting bar or element for establishing the angular position needed to position the scribing bar 30 at the angle and at the depth corresponding with the location of the reflecting horizon or interface which produced the reflection times of 0.468 and 0.437. This correcting bar and slide 26 has substantial length, that is to say, it extends outwardly and to the left of the depth scale of the chart on which the curve 12 appears and perpendicular thereto a distance adequate for the location of its center line 25a in a position coinciding with the shot point B and in manner later to be described. It is now only necessary to draw a line on the chart 17 along the edge 30a of the scribing bar 30 from the left-hand edge 15L a distance equal to the separation distance between the shot points A and B. The line so drawn on chart 17 is then representative of the reflecting horizon or interface.

While the clearances between the various parts are fairly evident from FIGS. 4–6, they are better illustrated in FIGS. 7–10. Thus, in FIG. 7 it will be noted the upper surface of arm 22 is at the same level as the upper surface of the supporting board 15, the thickness of cross section paper 13 including the time-depth chart being somewhat exaggerated. As shown in FIG. 8, the slide carrier 27 rests upon the time-depth chart 13 and extends above the upper surface of arm 22 and above its pivotal connection 21. The scribing arm 30, FIG. 9, is also at a height so that its upper surface is below the lower surface of the slide carrier 27.

The side view of FIG. 10 further illustrates the vertical positioning of the parts above the chart carrier 16. In this connection, it is to be noted that the slide 26 is preferably made of transparent material, with the scale 25 etched thereon to permit vision through the slide 26 for ease in positioning and in performing the computations already described.

Returning again to Table I, the second reflection for shot point A is plotted at the correct depth and dip by repeating the above steps. The time on scale 25 of 0.698 is positioned over the O—A point of the time-depth curve 12. The scale 25 is moved downwardly to intersect curve 12 at a 0. In this case it is the center 0 which intersects the lower half of curve 12. The scribing bar 30 is placed in alignment with the center of scale 25. Scale 25 is then moved upwardly until the time on that scale of 0.667, the travel time for the second reflection from the seismogram at shot point B, intersects curve 12. This occurs on the upper half of that curve. The board 15 is again rotated about its pivotal axis until the center line 25a of scale 25 again coincides with the shot point B. The reflecting surface for the second reflection is then drawn on the map or chart 17 along scribing bar 30, the line so drawn having a length corresponding with the distance between shot points A and B. The above procedure is repeated for the third and subsequent reflections, it being understood that there may be a great many reflections on each seismogram which it may be desired to utilize.

It will be observed that if the times for reflection of seismogram B are greater than that of a corresponding reflection of seismogram A, the negative portion 12a of the curve 12 will be utilized for the second positioning step for the scale 25. Whenever the center line 25a of scale 25 must be moved above the O—O line to bring a "zero" of its scale in coincidence with broken-line extension 12a of curve 12, the final step will be a counter-clockwise rotation of the time-depth curve 12 about the pivotal axis established at 19. Thus, the inclination will be reversed from those resulting from the times appearing in Table I, i.e., the dip will be in the opposite direction.

It will be further observed that the difference in time between seismogram A and seismogram B for the respective reflections comes to 0.031. The difference is the same in each case because there existed in the area being explored parallel isovelocity planes, as for example such as generally illustrated in FIG. 1. Where these conditions exist, the instrument provides a precise determination of depth, dip and offset, i.e., the migration of the reflecting surface.

After the last reflection of interest on seismograms "A" and "B" has been plotted with the pivot means 19 coinciding with the plotted position of shot point A, FIG. 3, the instrument will then be moved so that the pivotal point 19 coincides with the location plotted for shot point B preparatory to plotting the depth, dip and offset of reflections which appear on the second seismogram "B" and on a third seismogram obtained at shot point C. The arm or bar 22 has markings for ease in locating the positions of the several shot points on chart 17.

In moving the instrument from shot point A to shot point B, a correction is made to compensate for the lateral change in velocity indicated by the dip of the reflecting segments plotted from seismograms "A" and "B." More particularly, since the reflection times from seismogram "B" are less than corresponding reflection times from seismogram "A," it will be apparent that shot point B is "up-dip" from shot point A. In accordance with the present invention, the time-depth curve 12 which was obtained at shot point A is employed for plotting data obtained at short points B and C, but based upon a new zero point. In FIG. 3, the zero point O—A was employed with pivotal point 19 located at shot point A. A new zero point O—B will be employed for plotting operations with pivot means 19 at shot point B. The time difference "Z" between the zero point O—A and O—B will be made equal to the difference between the time of a given reflection on seismogram "A" and the time of the corresponding reflection on seismogram "B." From the values in Table I, it will be seen that interval Z is equal to 0.031 second. Thus, for plotting depth, dip and offset from data on seismograms "B" and "C," support 15 will be moved upward relative to the pivot 19 until an extension of a line which is parallel to line O—O but which passes through the new zero will pass through the center of pivot 19.

The new "zero" may be readily established by moving the slide carrier 27 upwardly until the center line 25a intersects the zero point O—A. The slide 26 is then adjusted until the difference-time 0.031 coincides with the point O—A. The slide carrier 27 if then moved downwardly until the adjacent zero on scale 25 intersects the curve 12. The chart carrier or board 15 is bodily moved upwardly relative to the arm 22 and its pivotal means 19 until the center line 25a on scale 25 intersects the axis of the pivotal means 19. There will then be established the new zero line passing through point O—B on curve 12 for the plotting of the additional data obtained from seismograms B and C.

The foregoing adjustment can be made immediately following the plotting of the last reflection as between seismograms A and B and with the support on chart carrier 15 in its angular position with the center line 25a passing through the location of the shot point B. With carrier 27 stationary in its last position, the support 15 is moved relative to pivot means 19 until the center line 25a passes through the axis of pivotal means 19. In accordance with the last described adjustment, the support 15 and the arm 22 are then moved along the datum line 18 until the axis of pivotal means 19 coincides with shot point B. The support or chart carrier 15 may then be clamped or otherwise secured in this position with reference to pivot 19 for plotting all reflections on seismograms "B" and "C" in a manner above described.

The newly established "zero" line passes through the point O—B and through the axis of pivotal means 19 and thus there is introduced the relative shift or correction in the location of the datum plane 18 for the computations based upon the data from shot points B and C.

At this point it should be noted that the times set forth in Table I indicate that all of the subsurface beds of interest are parallel, with dip in the same sense, and of equal magnitude. This is evident because the difference between the times of the first reflection in seismograms "A" and "B" is the same as the differences between the second and third reflections. Thus, it is clear that the time interval Z, FIG. 3, should be equal to such difference. However, in event the various beds have different dips, then it is necessary to select a time interval, such as the correction interval Z, which will most nearly fit all of the reflections. Ordinarily the average of the reflection time differences may thus be employed in selecting the new zero point on curve 12, FIG. 3. The reflection times taken from seismograms from the shot points B and C are then utilized in the manner described for the shot points A and B. The above procedures are then repeated for shot points C and D and the remaining shot points which will be utilized during a seismic survey.

Referring now to the embodiment of the invention in FIGS. 11–16, it is to be understood that features of construction in this embodiment may be utilized in the form of the invention of FIGS. 3–10. Both modifications have their own special advantages. Thus, in the instrument of FIG. 11, there is not utilized the time-depth scale in the form of a curve 12 plotted with time as abscissae and depth as ordinates. Instead, there is secured to a scale carrier 41 a scale 40 with the spacing of the horizontal lines thereon corresponding with the depth for equal increments of time. This will be understood by reference to FIG. 2 where for each equal increment of time there has been shown by the broken lines the corresponding depth. Thus, the spacing of the horizontal lines on the scale 40 corresponds with the intersection of each horizontal broken line with the zero-ordinate line. The horizontal markings on scale 40 are labeled in terms of the time scale forming the abscissae of FIG. 2. Thus, the scale 40 acts as a time-depth scale providing the same relationships as illustrated in FIG. 2 and utilized as the time-depth scale 12 of the embodiment of FIG. 3 and including the markings for negative times. The scale 40 as before may be drawn on paper or other strip material of a width to nest within a channel extending along the upper surface of the carrier 41 which, as shown in FIG. 15, may be the configuration of an I-beam. The scale suitably secured at the lower end, FIG. 11, is drawn tight and clamped by a clamping screw 42 at the upper end. Clamping means of the same type may be used at both ends of the carrier 41. The carrier is spaced above the plotting board 16, as by an arm 43 pivotally supported as at 44 by a tubular pivot pin about which the arm 43 can be rotated at a shot point P established on a line 18a representing the trace of the datum plane in manner described above. The pivot means 44 is carried by an arm 45a extending from a carriage 45 slidably mounted on a bar 46. The carriage 45 is clamped in fixed position to the bar as by rotation of a handle 47 of a clamping device of conventional construction. Similarly, the bar 46 is clamped to brackets 48 and 49 by means of the clamping mechanism including the operating handles 50 and 51. The arms 48 and 49 are clamped to the plotting board 16 in a position such that the supporting bar 46 extends parallel to the upper edge of the plotting board 16. In some instances it may not be convenient to make the pivot means 44 in the form of a tube. A transparent shaft with cross hairs provided at the axis may be found preferable. A rod 52 is secured by clamping structure including the handle 53, FIG. 12, in fixed position to the arm 45a. A carriage 55 is mounted for movement along the rod 52 so that the center of a target or finder 56, FIG. 16, may be spaced from the pivotal axis at 44 a distance proportional to the separation distance between shot points P and Q. A clamping means is then actuated as by handle 57 to hold the carriage 55 in fixed position. This arrangement including the finder 56 forms an indexing device for relatively positioning finder 56 and pivot means 44. By loosening the clamping means as by the handle 57, the carriage 55 can be moved along supporting bar 52 accurately to position the target or opening 56 above the shot point Q.

The embodiment of FIGS. 11–14 includes a scribing bar 60 arranged to be clamped by actuation of handle 61 to the carrier 41 and to extend in a direction normal to the scale 40. The scribing bar 60 has a shoulder 60b spaced the same distance from the scale 40 as the pivotal axis provided at 44. The scribing bar 60 has a window and an index line 60c which is helpful in accurately positioning of the drawing edge with respect to the scale 40.

From a carriage 64 slidable along carrier 41, there extends a correcting bar 65 of transparent material and including a line 65a, which bar and line perform the same functions as the central line 25a of scale 25 in its correcting functions described above for the embodiment of FIG. 3. The correcting bar 65 has a length greater than the separation distance between adjacent shot points as appearing on chart 17.

With the above understanding of the invention, it will be understood that a chart 17 is secured to the plotting board 16 as above described and that there is established on the chart the datum line 18a and the instrument positioned as already set forth. The carrier 41 is then moved relative to its supporting arm 43 until the 0 mark on the time-depth scale 40 coincides with the pivotal axis at 44. It is then clamped in position by turning handle 41a. The scribing bar 60 is then moved along the scale 40 until its drawing edge 60a coincides with the first reflection time for shot point P. In employing the system of FIG. 11, it will be found desirable to employ a tabulation of reflection times of the type illustrated in Table II since it is more convenient to shift scale 40 by reference to tabulated values rather than with reference to a curve as was the case in connection with the system or instrument of FIGS. 3–10. As will be noted from Table II, the first reflection time is 0.423.

TABLE II

| 1 | 2 | 3 | 4 |
|---|---|---|---|
| P | Q | Δt P–Q | Q corrected by 0.024 |
| 0.423 | 0.435 | −0.012 | 0.411 |
| 0.651 | 0.675 | −0.024 | 0.651 |
| 1.020 | 1.065 | −0.045 | 1.041 |

It will be noted that in Table II there appear in columns 1 and 2 the respective reflection times for shot points P and Q of the first three reflections, as well as column 3, labeled "Δt" which provides the difference between each of said times as from shot point P to shot point Q. These differences are all negative. Thus, the Δt term for the first reflection is −0.012. Use is made of this difference time in locating the position of the correcting bar 65. More particularly, it is moved until its center line 65a as appearing in the window 65b is in registry on the time-depth scale 40 at the value −0.012. the clamping arm 121 is then tightened and the carrier 41 rotated in a counterclockwise direction about the axis of the pivotal supporting means 44 until the center line 65a is positioned over indicator 56 above the shot point Q. The scribing edge 60a is then utilized for drawing the reflecting surface in its true location and with a length equal to the separation distance between the shot points P and Q. The above operations are repeated for the second and third reflections of Table II.

By providing the time-depth scale 40 and by utilizing the time differences Δt in the manner described, the end result in determining the depth, dip and offset for each reflection is the same as in the embodiments of FIGS. 3–10. Over-migration or excessive offset of the dips is again prevented.

The embodiment of FIG. 11 is suitable for plotting reflections representative of subsurface formations in which the attitudes or dips of successively deeper formations are uniform, as represented by data in Table I, or are different as indicated by data in Table II. It should be noted that in Table II the time difference Δt, column 3, (P—Q) for the first reflection is −0.012 second. The time difference Δt for the second reflection is considerably greater, being −0.024 second. This indicates a substantial thickening of the strata between the interfaces producing the first and second reflections in the section between shot point P and shot point Q. Similarly, for the third reflection, the time difference Δt is −0.045 second. Thus, there is indicated a thickening of the second bed or layer. In order to plot reflections from reflection times secured from record Q and from a record from a next succeeding shot point, a "selected intermediate time interval" Δt will be employed in order to establish a new zero point. From the values in Table II, the zero point may appropriately be shifted by the interval −0.024 second which is the intermediate Δt value found in column 2.

In order to establish the new zero point for plotting operations at shot point Q, the scale 40 will be moved relative to the pivot point at 44 in the following manner. The correcting bar 65 is moved upward from the position shown in FIG. 11 until the center line 65a as appearing in window 65b is in registry with the scale point −0.024. The clamping mechanism 121 will then be secured. The handle 41a is then turned to loosen its associated clamping mechanism. The scale carrier 41 is then moved downward until the center line 65a is in registry with the pivotal axis at 44. Clamping mechanism 41a is then actuated to secure scale carrier 41 in this new position. The system is now ready for plotting subsurface reflecting segments based upon reflection times taken from a seismogram obtained at shot point Q and a seismogram obtained at a shot point R.

Preparatory to plotting reflections from records "Q" and "R," the record times for reflection on record "Q" as appearing in the second column of Table II will be corrected by the selected intermediate value of Δt. As indicated, column 4 of Table II includes the values of reflection times of a record taken at shot point Q corrected by the selected value of −0.024 second. The corrected values for record of shot point "Q" may then be used with reflection times taken directly from a record obtained at the shot point for plotting the subsurface reflecting segments both as to depth, dip and offset. The correction procedure will then be continued for each of the shot points along a given traverse when employing the system of FIG. 11 whereby each time the pivot at 44, FIG. 11, is moved to the location of a new shot point a new zero will be established for scale 40 with reference to the pivot point 44.

Details of the latter operations will better be understood by reference to data in Table III.

TABLE III

| 2 | 5 | 6 | 7 | 8 |
|---|---|---|---|---|
| Q | R | $\Delta t'$ Q−R | $\Delta t''$ $\Delta t'$ corrected add −0.024 | R corrected by.0—0050 |
| 0.435 | 0.446 | −0.011 | −0.035 | 0.396 |
| 0.675 | 0.701 | −0.026 | −0.050 | 0.651 |
| 1.065 | 1.105 | −0.040 | −0.064 | 1.055 |

Reflection times from records obtained at shot points Q and R are listed in columns 2 and 5 respectively. The reflection time differences $\Delta t'$ are listed in column 6. Column 7 is a tabulation of values of $\Delta t''$ which are the values found in column 3 plus the selected intermediate value of 0.024 second found in Table II. The reflection times tabulated in column 4, Table II, will be used to set scribing bar 60. The $\Delta t'$ values tabulated in column 7, Table III, will be employed for setting the position of the correcting bar 65.

In order to proceed from shot point Q to plot data from shot point R and the next succeeding shot point, corrected values of R, as shown in column 8, Table III, will be computed and the operations above described repeated.

What is claimed is:

1. An instrument for contour plotting of subsurface strata comprising supporting means for supporting a time-depth scale over a chart on which depth, dip and offset are to be plotted, the chart having at a selected location a representation of a datum plane and shot points spaced one from the other a distance dependent upon the distance scale utilized for said time-depth scale, a scribing bar, supporting means for said scribing bar for moving it to a position on said first named supporting means corresponding with a selected reflection time for a first of said shot points, a correcting bar of substantial length, supporting means for movement of said correcting bar along said first named supporting means so that it may be positioned on said first named supporting means at a point spaced from the location of said scribing bar equal to the reflection time at a second of said shot points, said correcting bar extending from said first named supporting means toward said second shot point, and pivotal mounting means for said first named supporting means establishing an axis of rotation at the location of said first shot point for rotation of said first-named supporting means about said axis located in a position corresponding with a zero point along said scale until said correcting bar coincides with said second shot point, whereby said scribing bar is positioned at the proper depth and at the proper inclination for the drawing on said chart of the segment of subsurface strata represented by said reflection times at said shot points.

2. The instrument of claim 1 in which said first-named supporting means is provided with channels extending vertically thereof, said supporting means for said scribing bar and said correcting bar comprising runners respectively disposed in said channels and in which said pivotal mounting means has a runner disposed in one of said channels for sliding movement of said pivotal supporting means as a whole relative to said representation of said datum plane.

3. The instrument of claim 1 in which said correcting bar is disposed above both said scribing bar and said pivotal mounting means so that it can be moved along said first named supporting means without interference from either said scribing bar or said pivotal mounting means.

4. The instrument of claim 1 in which said supporting means for said time-depth scale comprises an elongated bar mounted for rotation about said pivotal mounting means and slidable relative thereto, said elongated bar having slidably mounted thereon said scribing bar and said correcting bar, said correcting bar being positioned on said time-depth scale in accordance with time differences between adjacent shot points for establishing the depth and dip of each reflecting surface for rotation of said elongated bar until the positioning line on said correcting bar coincides with the shot point adjacent the one at which said pivotal mounting means is located.

5. The instrument of claim 4 in which there is secured to said pivotal mounting means an indexing device located a distance therefrom corresponding with the separation distance between adjacent shot points for locating the index at one shot point and simultaneously to locate the pivotal mounting means at an adjacent shot point.

6. An instrument for contour plotting of subsurface strata, comprising a first chart-holder for a first chart on which there appears a graph of time vs. depth of a borehole, a second chart-holder for a second chart on which said contour-plotting is to be made and having thereon a datum line representing a datum plane, a bar movable to a position in alignment with said line, a pivotal connection between said bar and said first chart-holder, said bar having markings by means of which separation distances between shot points may be established, said first chart-holder being bodily movable to bring said pivotal connection into registry with a selected shot-point location on said datum line, a carriage movably supported on said first chart-holder for movement in a direction parallel with the depth direction of said first chart, said carriage having a slidable bar with a time scale corresponding with that of said first chart whereby said carriage and said slidable bar may be moved (a) to bring into coincidence an index line thereof with a point on said graph corresponding with zero time, (b) to bring said first chart to a position where the index line of said scale passes through said pivotal connection, said slidable bar being longitudinally movable to bring a selected time in registry with said zero time, said carriage being movable to bring a zero point on said scale into registry with said graph, a slidable scribing bar slidably mounted on said first chart holder extending parallel to said time scale of said first chart, said scribing bar being movable to a position to coincide with said index line to establish a position of depth on said second chart, said carriage being movable with said slidable bar in its last adjusted position until its time scale has a time corresponding with that of the same reflection at the next shot point coinciding with said graph, said first chart-holder being rotatable about said pivotal connection until said index line is over the point on said datum line corresponding with said next shot point to position said scribing bar for a plot of the reflecting segment between said shot points.

7. An apparatus for plotting seismic data comprising means for mounting a graph of time of travel of acoustic energy from the earth's surface to successively greater depths with the time axis of said graph parallel to a first line and the depth axis parallel to a second line perpendicular to said first line, a scale divided along its length in terms of the scale along said time axis, means for mounting said scale on said first named mounting means for movement lengthwise thereof parallel to said first line and transversely thereof parallel to said second line, pivot means for said first-named mounting means adapted to permit both translation of the first named means parallel to said second line and rotation of the first named means about an axis mutually perpendicular to both said first and said second lines, and a scribing bar positioned on said first-named mounting means perpendicular to said second line and to said depth axis by means movably mounting said bar along a path parallel to said second line.

8. An instrument for contour plotting of subsurface strata comprising supporting means for supporting over a chart on which depth, dip and offset are to be plotted a scale representative of time and depth, said chart having a datum plane with locations of shot points on said plane, a scribing bar, slidable supporting means for said scribing bar for moving it to a position on said first named supporting means corresponding with a selected reflection time for a first of said shot points, a correcting bar of substantial length, slidable supporting means for movement of said correcting bar along said first named supporting means so that it may be positioned at a point spaced from the location of said scribing bar equal to the reflection time at a second of said shot points, said correcting bar extending in a direction perpendicular to said first named supporting means and toward said second shot point, and pivotal mounting means for said first named supporting means establishing an axis of rotation therefor at the location of said first shot point for rotation of said supporting means about said axis until said correcting bar coincides with said second shot point, said pivotal mounting means including means for relative adjustment of said first named supporting means and said pivotal axis for predetermining the location of said datum plane relative to said scale, whereby said scribing bar is positioned at the proper depth and at the proper inclination for the drawing on said chart of the segment of subsurface strata represented by said reflection times at said shot points.

9. An instrument for contour plotting of subsurface strata comprising supporting means for supporting a time-depth scale over a chart on which depth, dip and offset are to be plotted, the chart having marked thereon a line representing the trace of a datum plane and along which the shot points are spaced with the same distance scale as utilized for said time-depth scale, a scribing bar having a scribing edge, slidable supporting means for said scribing bar for moving it to a position on said first mentioned supporting means corresponding with a selected reflection time for a first of said shot points, a correcting bar of substantial length, slidable supporting means for movement of said correcting bar along said first mentioned supporting means so that it may be positioned on said first mentioned supporting means at a point spaced from the location of said scribing bar equal to the reflection time at a second of said shot points adjacent said first shot point, said correcting bar extending in a direction normal to said first mentioned supporting means on the same side thereof as the location of said second shot point, and pivotal mounting means for said first mentioned supporting means establishing an axis of rotation therefor at the location of said first shot point for rotation of the time-depth scale about said axis until a line on said correcting bar coinciding with its setting on said time-depth scale extends through the location of said second shot point, whereby said scribing edge is positioned at the proper depth and at the proper inclination for the drawing on said chart of the segment of subsurface strata represented by said reflection times at said shot points.

10. An instrument for contour plotting of subsurface strata comprising a time-depth scale in the form of a curve with time as abscissae and depth as ordinates, supporting means for supporting said time-depth scale over a chart on which depth, dip and offset are to be plotted, said chart having at a selected location a representation of a datum plane and shot points spaced one from the other a distance dependent upon the distance scale utilized for said time-depth scale, a scribing bar, supporting means for said scribing bar for moving it to a position on said time-depth scale corresponding with a selected reflection time for a first of said shot points, a correcting bar of substantial length, said correcting bar having a time scale corresponding with that of the abscissae of said time-depth scale, supporting means for movement of said correcting bar along said time-depth scale so that it may be positioned on said time-depth scale at a point spaced from the location of said scribing bar equal to the reflection time at a second of said shot points, said correcting bar extending from said time-depth scale toward said second shot point, and pivotal mounting means for said time-depth scale establishing an axis of rotation at the location of said first shot point for rotation of said first-named supporting means about said axis located in a position corresponding with a zero point along said scale until said correcting bar coincides with said second shot point, whereby said scribing bar is positioned at the proper depth and at the proper inclination for the drawing on said chart of the segment of subsurface strata represented by said reflection times at said shot points.

11. An instrument for contour plotting of subsurface strata comprising a time-depth scale in the form of a folded curve with time as abscissae and depth as ordinates, said folded curve including a plurality of sections, supporting means for supporting said time-depth scale over a chart on which depth, dip and offset are to be plotted, the chart having at a selected location a representation of a datum plane and shot points spaced one from the other a distance dependent upon the distance scale utilized for said time-depth scale, a scribing bar, supporting means for said scribing bar for moving it to a position on said time-depth scale corresponding with a selected reflection time for a first of said shot points, a correcting bar of substantial length, said correcting bar having time scales lengthwise thereof, one for each said section of said time-depth scale and each of ascending order in the same direction along said bar, supporting means for movement of said correcting bar along said time-depth scale so that it may be positioned on said time-depth scale at a point spaced from the location of said scribing bar equal to the reflection time at a second of said shot points, said correcting bar extending from said time-depth scale toward said second shot point, and pivotal mounting means for said time-depth scale establishing an axis of rotation at the location of said first shot point for rotation of said first-named supporting means about said axis located in a position corresponding with a zero point along said scale until said correcting bar coincides with said second shot point, whereby said scribing bar is positioned at the proper depth and at the proper inclination for the drawing on said chart of the segment of subsurface strata represented by said reflection times at said shot points.

References Cited in the file of this patent

UNITED STATES PATENTS

| 2,463,788 | McGuckin | Mar. 8, 1949 |
| 2,535,220 | McGuckin | Dec. 26, 1950 |
| 2,880,510 | Sisson et al. | Apr. 7, 1959 |

UNITED STATES PATENT OFFICE
CERTIFICATE OF CORRECTION

Patent No. 2,990,619                                    July 4, 1961

Albert W. Musgrave

It is hereby certified that error appears in the above numbered patent requiring correction and that the said Letters Patent should read as corrected below.

Column 1, line 16, after "by" insert -- the --; column 5, line 29, strike out "or"; line 42, for "suport" read -- support --; column 7, line 44, for "short" read -- shot --; column 10, line 6, for "the", first occurrence, read -- The --; column 11, TABLE III, heading to column 5 thereof, for "by.0-0050" read -- by -0.050 --; line 19, for "0.024" read -- -0.024 --.

Signed and sealed this 23rd day of January 1962.

(SEAL)
Attest:

ERNEST W. SWIDER                                DAVID L. LADD
Attesting Officer                                  Commissioner of Patents